United States Patent
Katnic

(10) Patent No.: US 9,256,857 B2
(45) Date of Patent: *Feb. 9, 2016

(54) SCHEDULING START-UP AND SHUT-DOWN OF MAINFRAME APPLICATIONS USING TOPOGRAPHICAL RELATIONSHIPS

(75) Inventor: Joseph John Katnic, Perth (AU)

(73) Assignee: International Business Machines Corporation, Armonk, NY (US)

( * ) Notice: Subject to any disclaimer, the term of this patent is extended or adjusted under 35 U.S.C. 154(b) by 907 days.

This patent is subject to a terminal disclaimer.

(21) Appl. No.: 13/423,508

(22) Filed: Mar. 19, 2012

(65) Prior Publication Data

US 2012/0180069 A1  Jul. 12, 2012

Related U.S. Application Data

(63) Continuation of application No. 11/962,793, filed on Dec. 21, 2007, now Pat. No. 9,003,274.

(51) Int. Cl.
| | |
|---|---|
| *G06F 17/00* | (2006.01) |
| *G06Q 10/10* | (2012.01) |
| *G06Q 10/00* | (2012.01) |
| *G06F 17/25* | (2006.01) |
| *G06F 17/24* | (2006.01) |
| *G06F 17/22* | (2006.01) |

(52) U.S. Cl.
CPC .............. *G06Q 10/10* (2013.01); *G06Q 10/00* (2013.01); *G06F 17/2252* (2013.01); *G06F 17/245* (2013.01); *G06F 17/25* (2013.01); *Y10S 715/965* (2013.01); *Y10S 715/966* (2013.01)

(58) Field of Classification Search
CPC ... G06F 17/25; G06F 17/245; G06F 17/2252; G06Q 10/10; G06Q 10/00; Y10S 715/965; Y10S 715/966

USPC ............ 715/227, 965–966; 375/240.16; 712/14–16; 718/100–105; 705/7.13–7.26; 711/166; 714/13
See application file for complete search history.

(56) References Cited

U.S. PATENT DOCUMENTS

| | | | |
|---|---|---|---|
| 5,016,170 A | 5/1991 | Pollalis et al. | |
| 6,728,862 B1 | 4/2004 | Wilson | |
| 7,065,673 B2 * | 6/2006 | Subramaniam et al. | ........ 714/13 |
| 2003/0061265 A1 | 3/2003 | Maso | |

(Continued)

OTHER PUBLICATIONS

Office Action regarding U.S. Appl. No. 11/962,793, dated Apr. 26, 2012, 20 pages.
Office Action regarding U.S. Appl. No. 11/962,793, dated Aug. 16, 2013, 26 pages.
Office Action regarding U.S. Appl. No. 11/962,793, dated Feb. 28, 2014, 34 pages.

(Continued)

*Primary Examiner* — Quoc A Tran
(74) *Attorney, Agent, or Firm* — Yee & Associates, P.C.; Joseph Petrokaitis

(57) ABSTRACT

The illustrative embodiments provide for a computer-implemented method for representing actions in a data processing system. A table is generated. The table comprises a plurality of rows and columns. Ones of the columns represent corresponding ones of computer applications that can start or stop in parallel with each other in a data processing system. Ones of the rows represent corresponding ones of sequences of actions within a corresponding column. Additionally, the table represents a definition of relationships among memory address spaces, wherein the table represents when each particular address space is started or stopped during one of a start-up process, a recovery process, and a shut-down process. The resulting table is stored.

13 Claims, 5 Drawing Sheets

(56) References Cited

U.S. PATENT DOCUMENTS

| | | |
|---|---|---|
| 2003/0236814 A1 | 12/2003 | Miyasaka et al. |
| 2004/0139439 A1 | 7/2004 | Machida |
| 2005/0055525 A1* | 3/2005 | Chuang et al. ................ 711/166 |
| 2005/0086637 A1 | 4/2005 | Chatterjee |
| 2006/0053043 A1 | 3/2006 | Clarke |
| 2010/0332793 A1 | 12/2010 | Katnic |
| 2011/0010715 A1 | 1/2011 | Papakipos et al. |

OTHER PUBLICATIONS

Final Office Action, dated Sep. 11, 2014, regarding U.S. Appl. No. 11/962,793, 54 pages.
Notice of Allowance, dated Dec. 3, 2014, regarding U.S. Appl. No. 11/962,793, 19 pages.
USPTO Non Final Office Action, U.S. Appl. No. 11/962,793, Jan. 16, 2013, 20 pages.

* cited by examiner

SCHEDULING START-UP AND SHUT-DOWN OF MAINFRAME APPLICATIONS USING TOPOGRAPHICAL RELATIONSHIPS

CROSS-REFERENCE TO RELATED APPLICATION(S)

This application is a continuation of and claims the benefit of priority to U.S. patent application Ser. No. 11/962,793, filed on Dec. 21, 2007 and entitled "Method for Scheduling Start-Up and Shut-Down of Mainframe Applications using Topographical Relationships," status pending, the contents of which are hereby incorporated by reference.

BACKGROUND OF THE INVENTION

1. Field of the Invention

The present invention is directed generally towards an improved data processing system, and in particular, to methods for representing relationships between actions a computer takes during start-up or shut-down. Still more particularly, the present invention is directed towards a method for representing a correct order of start-up and shut-down actions to implement a clean start-up or shut-down.

2. Description of the Related Art

When starting up or powering down a computer, particularly with respect to complex computers such as mainframes, the order in which address spaces in the computer are processed is important. If address spaces are not processed in a proper or expected order, a computer can exhibit emergent behavior that causes undesired consequences such as, but not limited to, system crash, loss of data, or other problems.

The order in which address spaces are to be processed is often predetermined by a user. The user programs the order in which address spaces should be processed. In order to define this order, the user must know the relationships between the various address spaces.

Known systems for representing these relationships define the order of start-up and shut-down actions using a graph which maps the order of start-up and shut-down actions associated with each individual node. The graph can be represented by a series of nodes that have multiple relationships.

These graphs can be very difficult for a human user to understand, particularly when they become large. For some existing systems, over three hundred graph nodes are present, with multiple interdependencies among multiple different nodes. Complicating this analysis, humans can generally hold only up to about seven items in their immediate short term memory for processing. This limited item queue presents a problem when a human user attempts to determine the results of an interaction using such a graph. Especially for large graphs, a human user cannot compute a resulting action, or investigate a hypothetical change in the graph, without the assistance of either a computer or at least a picture of the relationship graph. To make matters more confusing for the human user, requests for start-up and shut-down injected into the graph causes a ripple votes being passed from node to node via the defined relationships. The vote might not cause a given node to take the desired action if another vote of higher preference is already present at the node.

The result of these interactions on the graph is confusion for the user. Worse, a user may unintentionally create undesirable actions that should not be taken during a start-up or shut-down procedure, thereby possibly causing the precise undesired consequences that the human user sought to avoid.

SUMMARY OF THE INVENTION

The illustrative embodiments provide for a computer-implemented method, computer program product, and data processing system for representing dependencies among tasks in a table. A first table element is generated. The first table element comprises a first plurality of cells. Ones of cells in the first plurality of cells represent corresponding ones of the tasks. For any two cells in the first plurality of cells, the first cell in the first plurality of cells represents a first task that must be preformed prior to commencement of a second task represented by a second subsequent cell in the first plurality of cells, relative to a base direction that is parallel to the first table element. Additionally, a second table element is generated that is parallel to the first table element. The second table element comprises a second plurality of cells. Ones of cells in the second plurality of cells represent corresponding ones of the tasks. For any two cells in the second plurality of cells, the first cell in the second plurality of cells represents a first task that must be preformed prior to commencement of a second task represented by a second subsequent cell in the second plurality of cells, relative to the base direction. In every instance where a particular one of the tasks represented by a particular one of the cells in the first column must be completed prior to commencement of a second particular one of the tasks represented by a second particular one of the cells in the second column, the second particular one of the cells in the second column is subsequent to the first particular one of the cells in the first column, relative to the base direction.

In an illustrative embodiment, the first table element and the second table element are rows. Similarly, the first table element and the second table element can be columns. The table can comprise part of a user interface. Additionally, the table can be used to control sequentially dependent operations of a computer system. In another illustrative embodiment, the tasks are performed pursuant to one of shutting down a data processing system, restoring a data processing system, and starting a data processing system.

In still another illustrative embodiment, each of the first plurality of cells and each of the second plurality of cells corresponding contain control information. The control information can be one or more of a first command to start a corresponding task represented by a corresponding cell; a second command to stop the corresponding task represented by the corresponding cell; and a third command to indicate that the corresponding task, represented by the corresponding cell, has entered a recovery mode. The control information can be timing information that determines at which time a corresponding task can be processed. The control information can be enabling information that determines whether a corresponding task will participate in one of a start-up phase of a data processing system, a recovery phase of the data processing system, or a shut-down phase of the data processing system.

In another illustrative embodiment, the first table element is a first row and the second table element comprises a second row. In this case, the table comprises corresponding columns created by the first table element and the second table element. The tasks are represented as being processed in parallel for each of the corresponding columns.

In another illustrative embodiment, at least one of the first table element and the second table element contains a coordinated event that needs to be represented across a plurality of the corresponding columns. For the coordinated event, parallel processing is represented as being interrupted at ones of the cells corresponding to the coordinated event until the coordinated event is resolved.

In yet another illustrative embodiment, a particular cell comprises an element. Cells above and to the left of the particular cell represent additional elements that are required for the element to be processed. Cells below and to the right of the particular element represent second additional elements that require the element.

The illustrative embodiments also provide for a particular cell being a synonym element. Furthermore, the table can represent a definition of relationships among memory address spaces, wherein the table represents when each particular address space is started or stopped during one of a start-up process, a recovery process, or a shut-down process.

The illustrative embodiments also provide for a recordable type medium storing a table. The table comprises a plurality of rows and columns. Ones of the columns represent corresponding ones of computer applications that can start or stop in parallel with each other in a data processing system. Ones of the rows represent corresponding ones of sequences of actions within a corresponding column.

In a parallel mode, the table represents processing that proceeds in parallel down each column simultaneously while corresponding processing row elements in turn. In a serial mode, the table represents processing that proceeds across corresponding ones of rows, processing each column event in the corresponding rows in turn.

In an illustrative embodiment, a given cell of the table comprises an element. Elements above and to the left of a particular element represent those first elements that are required for the particular element to be processed. Elements below and to the right of the particular element represent those second elements that require the particular element to be processed.

Similarly, a given cell of the table comprises an element, wherein a first synonym element and a second synonym element represent a same resource. The first synonym element is in the same row as the second synonym element, and also in any column to the right of the second synonym element. The second synonym element is represented as to be processed after the first synonym element. The designation of the first synonym element and the second synonym element represent that a first column of the table is to be processed after a second column has reached a desired state.

In another illustrative embodiment, the table represents a definition of relationships among memory address spaces. In this case, the table represents when each particular address space is started or stopped during one of a start-up process, a recovery process, or a shut-down process.

The illustrative embodiments also provide for a computer-implemented method for representing actions in a data processing system. A table is generated. The table comprises a plurality of rows and columns. Ones of the columns represent corresponding ones of computer applications that can start or stop in parallel with each other in a data processing system. Ones of the rows represent corresponding ones of sequences of actions within a corresponding column. Additionally the table represents a definition of relationships among memory address spaces, wherein the table represents when each particular address space is started or stopped during one of a start-up process, a recovery process, or a shut-down process. The resulting table is stored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
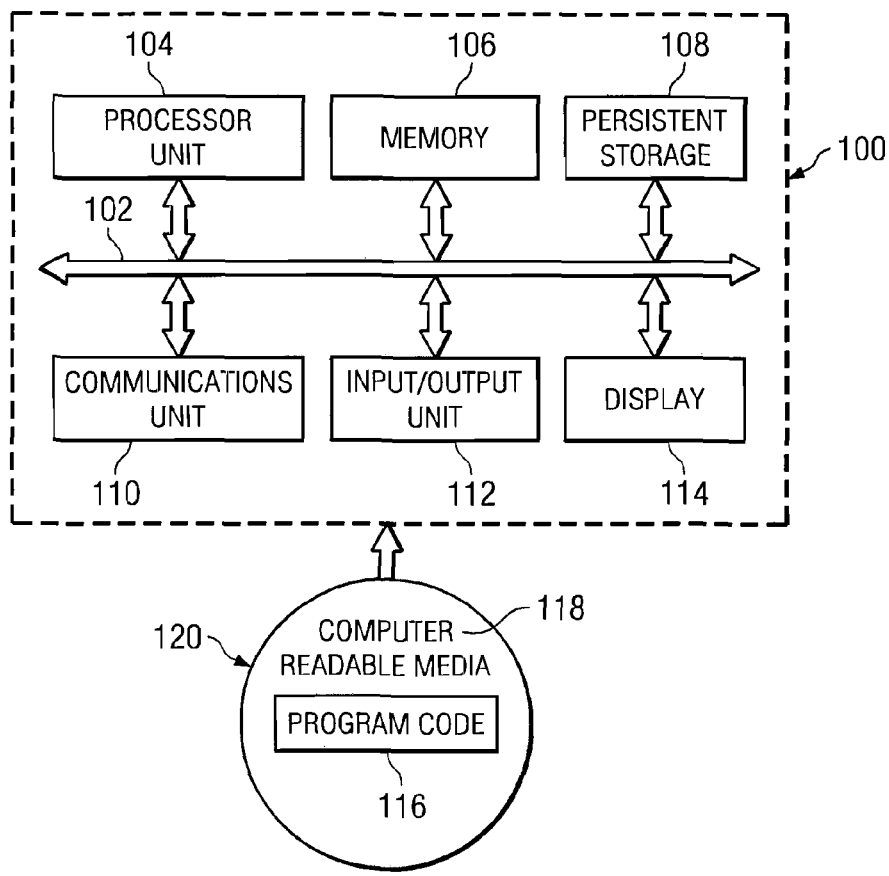
FIG. 1 is a block diagram of a data processing system in which the illustrative embodiments may be implemented.

FIG. 1 is a block diagram of a data processing system in which the illustrative embodiments may be implemented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse.

Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
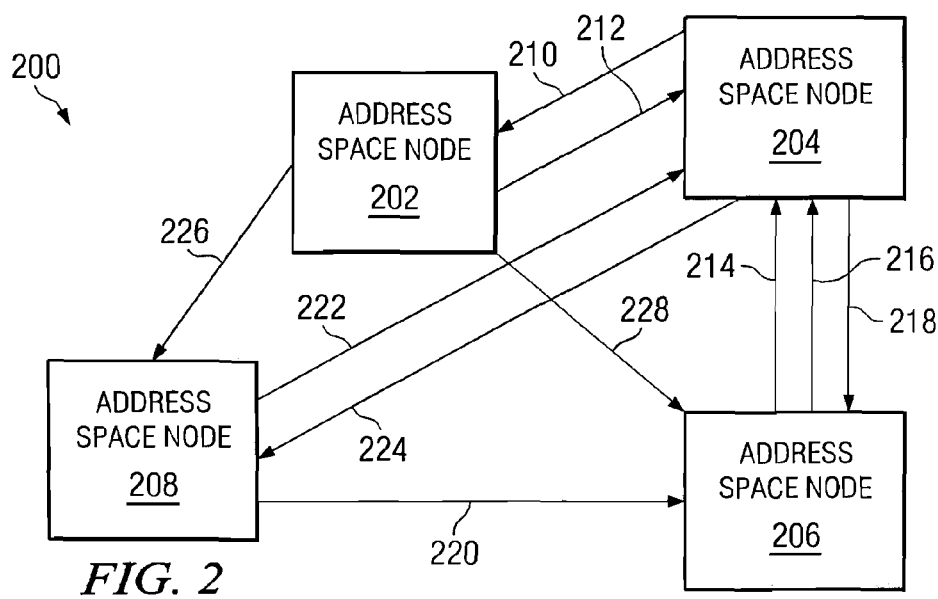
FIG. 2 is an example of a prior art node graph.

FIG. 2 is an example of a prior art node graph. The prior art graph 200 shown in FIG. 2 can be implemented in a data processing system such as data processing system 100 shown in FIG. 1.

Prior art graph 200 shows relationships and interdependencies among address space nodes in a complex data processing system. Prior art graph 200 contains four nodes: Address space node 202, address space node 204, address space node 206, and address space node 208. Each address space node has one or more interdependencies with at least one other address space node. In particular, address space node 202 receives information from address space node 204, as shown by line 210, and similarly address space node 202 provides information to address space node 204, as shown by line 212.

Additionally, address space node 204 and address space node 206 relate to each other in at least three different ways, as shown by line 214, line 216, and line 218. Similarly, address space node 206 interacts with address space node 208, as shown by line 220. Additionally, address space node 206 interacts with address space node 202 as shown by line 228. Additionally, address space node 208 interacts with address space node 204 as shown by lines 222 and 224. Address space node 208 interacts with address space node 202 as shown by line 226.

Thus, prior art graph 200 shows a series of complex interrelationships between each of the address space nodes. A change to any one of the address space nodes, or a change to the relationship of any one of the address space nodes with another address space node, can possibly change the other relationships. The complexity of prior art graph 200 grows exponentially with the number of address space nodes. For actual complex data processing systems the number of address space nodes can exceed three hundred, with multiple interactions among each of the address space nodes. Thus, even if prior art graph 200 is precise and accurate, prior art graph 200 often is not useful to a human user, or at least is very difficult for a human user to use.

The illustrative embodiments described herein address the problem of representing relationships among address space nodes through actions to be taken as represented by a data processing system as represented on a table. Specifically, the illustrative embodiments use a table to define the relationships between address space nodes. The relative position of the table determines when an address space is started or stopped. Because the information is presented in the form of a table, an operator can see at a glance how the address spaces are related and what, if any, consequences an action or proposed action might have.

Figure 3:
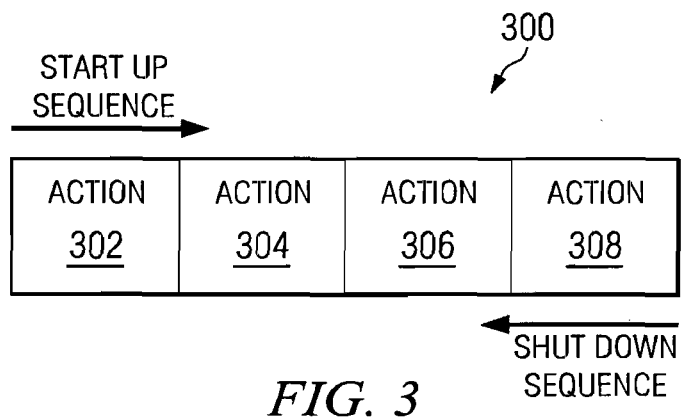
FIG. 3 is a block diagram of a table for representing a series of actions to be taken in a data processing system, in accordance with an illustrative embodiment.

FIG. 3 is a block diagram of a table for representing a series of actions to be taken in a data processing system, in accordance with an illustrative embodiment. Table 300 shown in FIG. 3 can be implemented in a data processing system, such as data processing system 100 shown in FIG. 1. Table 300 represents a trivial case for designating a series of actions to be taken in a data processing system during a start-up sequence or a shut-down sequence. Specifically, action 302, action 304, action 306, and action 308 are taken in ascending numerical order during a start-up sequence and in descending numerical order during a shut-down sequence as shown by the relative arrows.

Table 300 can be referred to as a vector sequence of actions. For relatively simple data processing systems, table 300 is sufficient for designating the interactions between address space nodes during a start-up or shut-down sequence. However, in a complex operating system environment, a more sophisticated table should be used to represent a proper start-up or shut-down sequence.

Figure 4:
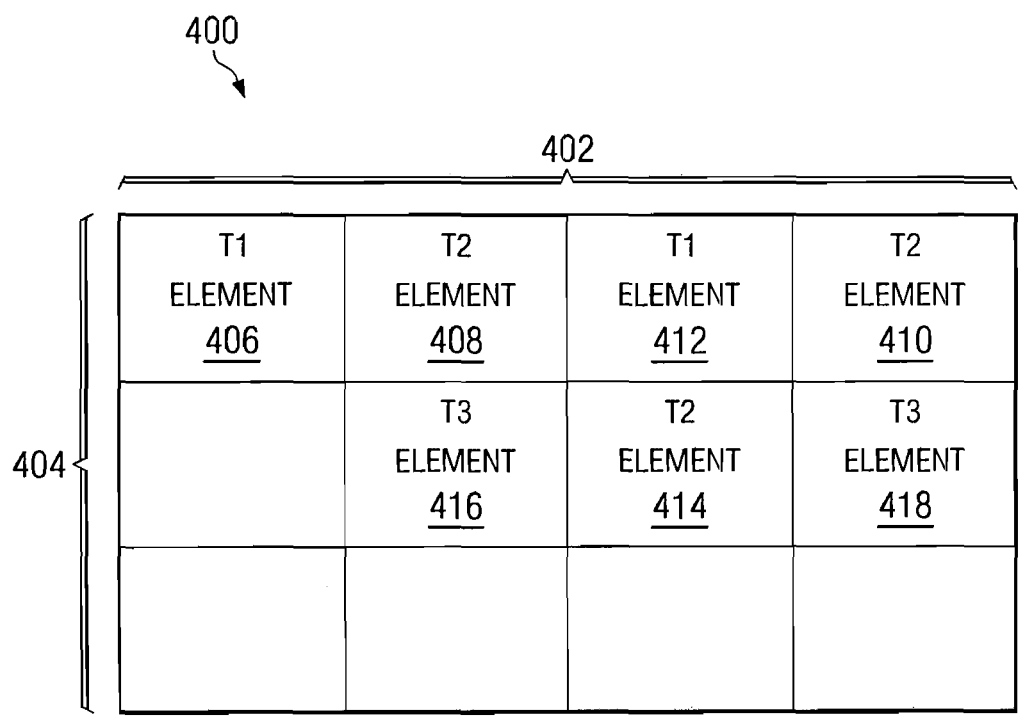
FIG. 4 is a table showing a series of actions to be taken by a data processing system, in accordance with an illustrative embodiment.

FIG. 4 is a table showing a series of actions to be taken by a data processing system, in accordance with an illustrative embodiment. Table 400 can be implemented in a data processing system, such as data processing system 100 shown in FIG. 1.

Table 400 shown in FIG. 4 includes a series of columns 402 and a series of rows 404. Each column in series of columns 402 represents the particular application. Each row in series of rows 404 represents a particular action to be taken with respect to an application during a shut-down procedure, a start-up procedure, or a recovery procedure. Each individual cell within table 400 can be referred to as an element. Although table 400 shows four columns and three rows, and hence twelve elements, this number of rows and columns in table 400 can be increased or decreased in different illustrative embodiments.

The illustrative embodiment shown in FIG. 4 actions are represented as being taken, if possible, in parallel—from top to bottom in any given column. Thus, for example, element 406 and element 412 are processed in parallel at time T1. Ideally, element 408 and element 410 should also be processed at time T1.

However, for whatever reason, element 408 and element 410 depend on either one or both of element 406 or element 412 to be processed before element 408 and/or element 410 can be processed. Alternatively, element 408 depends on either element 406 or element 412, and element 410 depends on element 408. Thus, element 408 and element 410 are processed at time T2, as shown in graph 400.

At time T2, element 414 is also processed at the same time that elements 408 and elements 410 are processed. At time T3, element 416 and element 418 can be processed because these actions are processed after elements 408 and 410, respectively, as element 416 and element 418 are in a row below the initial starting row.

Figure 5:
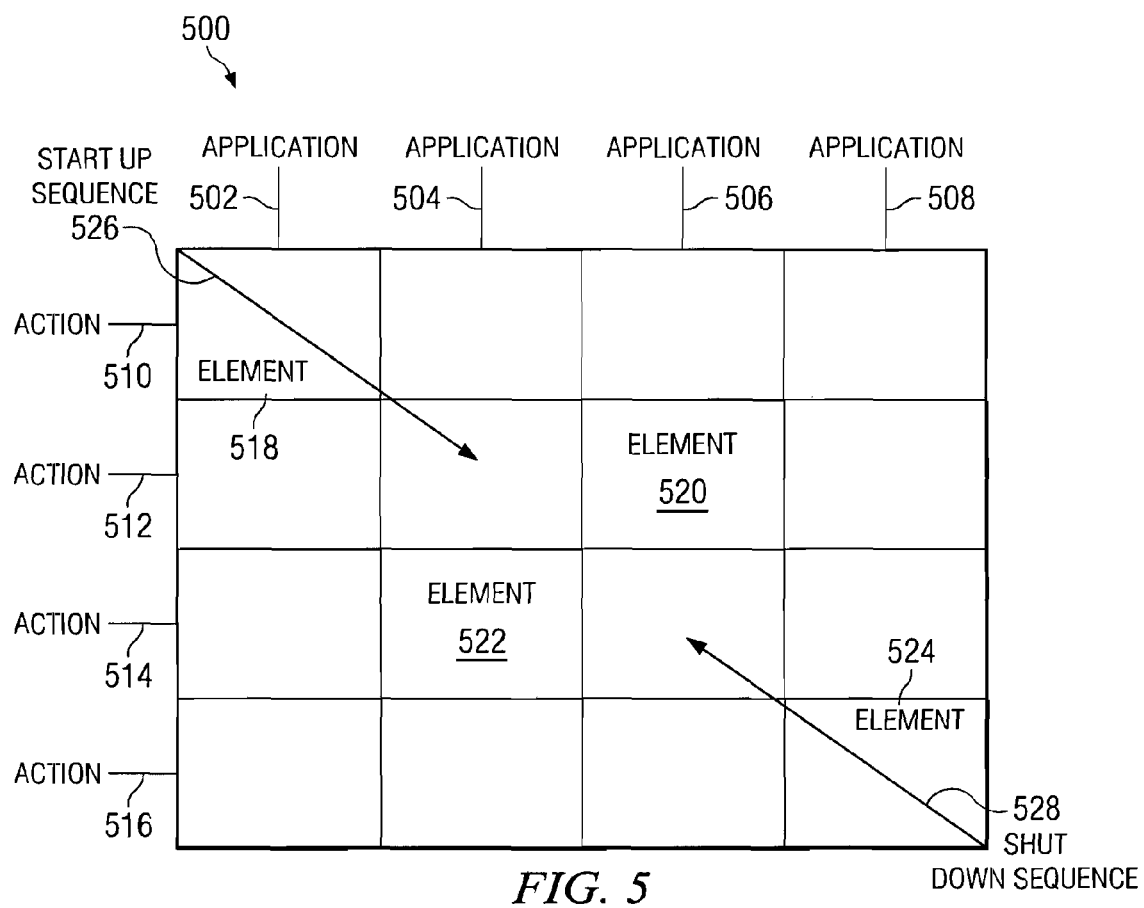
FIG. 5 is a table showing a series of actions to be taken in a data processing system, in accordance with an illustrative embodiment.

FIG. 5 is a table showing a series of actions to be taken in a data processing system, in accordance with an illustrative embodiment. The table shown in FIG. 5 can be implemented in a data processing system, such as data processing system 100 shown in FIG. 1 or data processing system 200 shown in FIG. 2. Table 500 shows a series of columns, such as column 502, column 504, column 506, and column 508. Each of column 502, column 504, column 506, and column 508 represent different applications. Additionally, table 500 represents a number of actions through the use of the rows, such as, for example, row 510, row 512, row 514, and row 516. Each such row refers to a different action.

Individual cells within table 500 can be referred to as elements. As arranged in table 500, the different elements show the relationships between various address spaces occupied by the different applications in column 502, column 504, column 506, and column 508.

Thus, for example, element 518 represents an action in row 510 to be taken with respect to an application represented by column 502. Similarly, element 520 represents an action to be taken in row 512 for an application represented by column 506. Likewise, element 522 represents an action in row 514 to be taken with respect to an application represented by column 504. Finally, element 524 represents an action in row 516 to be taken with respect to an application represented by column 508.

In the illustrative embodiments shown in FIG. 5, a start-up sequence can be represented generally by taking actions from cells read from the top left towards the bottom right, as illustrated by arrow 526. In contrast, a shut-down sequence can be represented by reading the graph from the bottom right cell from right to left towards the upper left cell element, as illustrated by arrow 528.

As with table 400 of FIG. 4, ideally actions should be taken in a given row in parallel for each application in column 502, column 504, column 506, and column 508. This series of actions taken in parallel with each other can be referred to as parallel mode. However, this procedure might not be available if interdependencies exist among different elements in table 500.

When interdependencies exist, a coordinated event needs to occur across the application columns. The series of actions taken to account for these interdependencies can be referred to as serial mode. In serial mode, a given row is designated as a serial mode row. Serial mode rows alter the default processing to go across the row, processing each row element row in turn. Serial mode is applied on a row by row basis. An example of serial mode is shown with respect to table 400 shown in FIG. 4.

Figure 6:
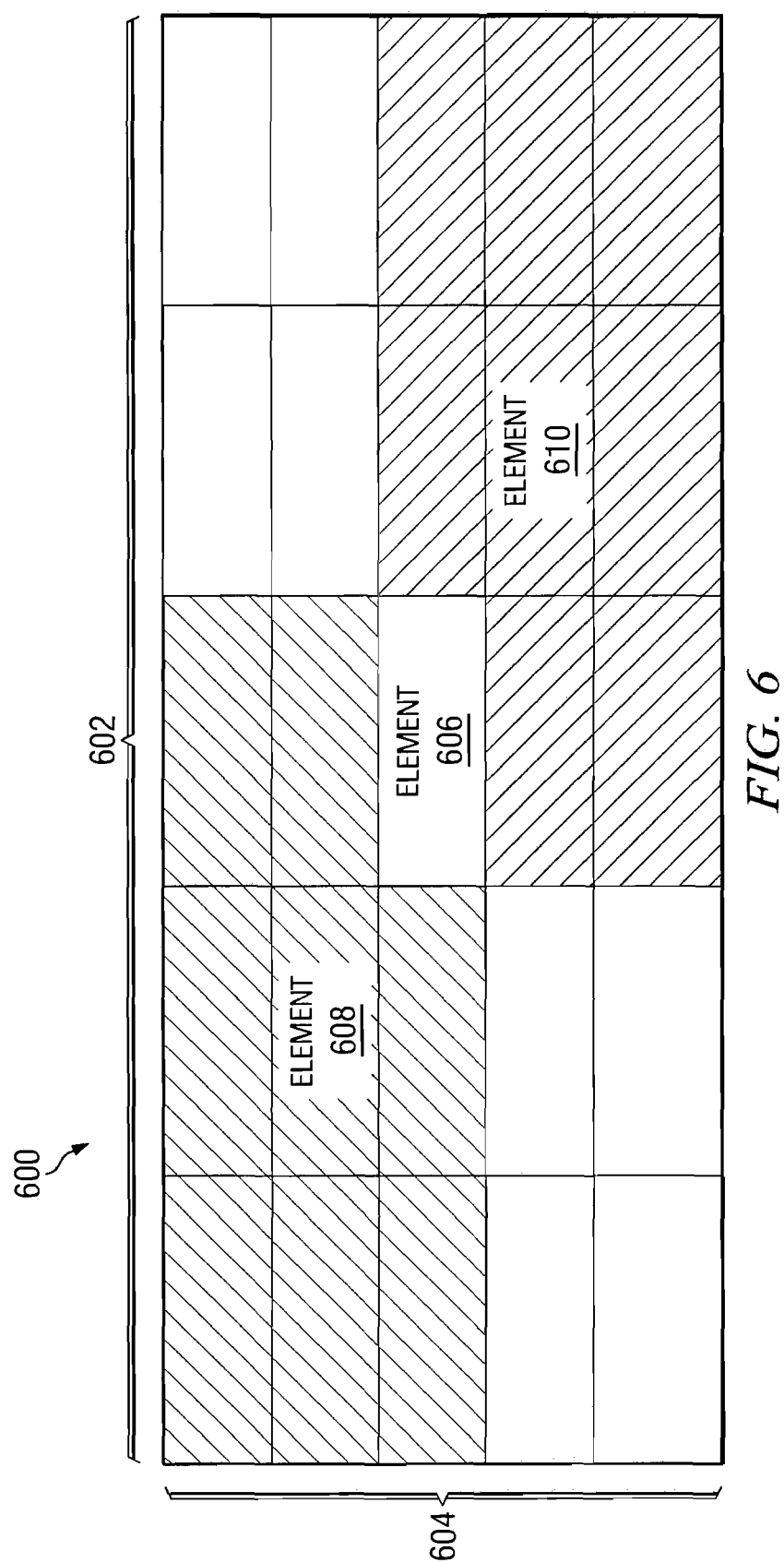
FIG. 6 is a table illustrating interrelationships between elements for actions to be taken in a data processing system, in accordance with an illustrative embodiment.

FIG. 6 is a table illustrating inter-relationships between elements for actions to be taken in a data processing system, in accordance with an illustrative embodiment. Table 600 can be implemented in a data processing system such as data processing system 100 shown in FIG. 1.

In particular, FIG. 6 shows the interdependency of elements within graph 600. In this illustrative example, graph 600 is the same as graph 500; however, table 600 is graphically modified to show different information.

In general, any given element in table 600 depends on elements above and to the left of the given element. Thus for example, all elements within the right-leaning hash-marks, such as element 608, represent elements that are required for element 606 to be processed. Similarly, a given element is required by elements below and to the right of the given element. Thus, for example, all elements within the left-leaning hash-marks, such as element 610, are elements that require element 606.

Figure 7:
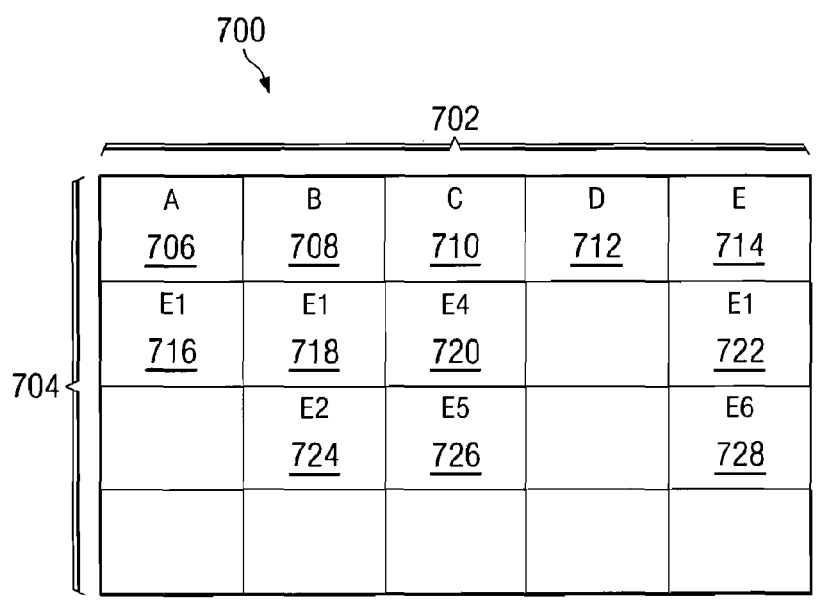
FIG. 7 is a table showing a series of actions to be taken by data processing system, in accordance with an illustrative embodiment.

FIG. 7 is a table of the series of actions to be taken in data processing system, in accordance with an illustrative embodiment. Table 700 shown in FIG. 7 can be implemented in a data processing system, such as data processing system 100 shown in FIG. 1. Table 700 shows the interdependency of various elements within graph 700.

There are occasions when an element from a column to the right might need an element from the column to the left to be processed first. This preferential processing can be accomplished by altering row processing to serial mode; however, such altering forces the entire row into serial mode and thereby will interrupt other unrelated applications.

To address this problem, a given element can wait for another element to be processed, without interrupting the processing of other elements within the same row. However, only those elements that do not rely on another element within the row will be processed in parallel.

For example, an element in the same row, put in any column to the right of an element, can represent the same resource. These elements are termed synonyms. Synonym elements perform no actions, but will wait for the left most element to be processed. The use of synonyms allows one column to wait until another column has reached a desired state. FIG. 7 provides an illustrative example of the use of synonyms.

In FIG. 7, columns 702 once again represent applications, such as application A 706, application B 708, application C 710, application D 712, and application E 714. Additionally, rows 704 represent different actions to be taken with respect to an application during the start-up phase, recovery phase, or shut-down phase of a data processing system.

As shown in FIG. 7, each column that element E1 in the same row has a dependency on the E1 in column A. Thus, E1 in element 718 and E1 in element 722 depend on the E1 in element 716. In this case, processing of column B 708 and column E 714 will stop at element 716 at the E1 synonym there, and wait until the E1 in element 716 has been processed. Meanwhile, column C 710 will process elements E4 in element 720 and E5 in element 726 independently of column A 706, column B 708, or column E 714.

Stated differently, in this illustrative example, processing of E1 in element 716 will proceed simultaneously with processing of E4 in element 720. Thereafter, processing of element E1 in element 718 will be conducted, whereupon processing of E2 in element 724 can be performed at the same time as the processing of E5 in element 726. Additionally, after E1 in element 718 has been processed, element E1 in element 722 can be processed. Thereafter, E6 in element 728 is processed.

Figure 8:
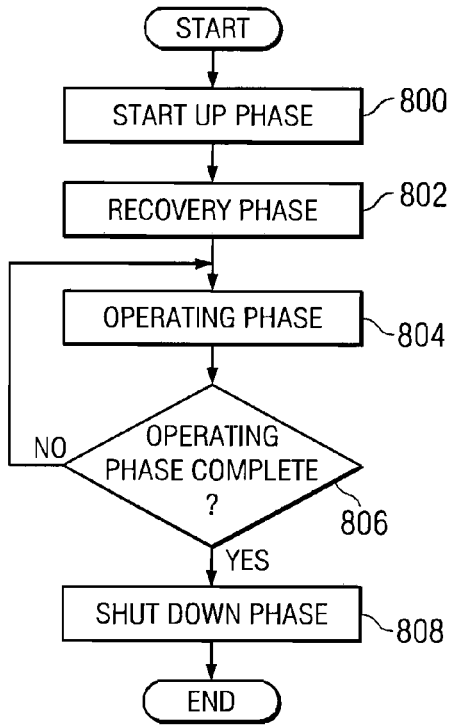
FIG. 8 is a flowchart of a life cycle of a data processing system, in accordance with an illustrative embodiment.

FIG. 8 is a flowchart of a life cycle of a data processing system, in accordance with an illustrative embodiment. Specifically, the process shown in FIG. 8 represents points in the life cycle of a data processing system at which the illustrative methods for representing actions are most useful. The process shown in FIG. 8 can be implemented in a data processing system such as data processing system 100 shown in FIG. 1.

The process begins with a start-up phase (step 800). During the start-up phase, the data processing system is "booting." The start-up phase processes the element or actions with the aim of starting the resources represented by the respective elements. The start-up phase sets the direction of element processing from top to bottom, left to right in the tables described in FIG. 3 through FIG. 7. Thus, elements at the top left are processed before elements at the bottom right. In parallel mode, all columns are processed in top to bottom mode independently of each other.

Next, the data processing system enters a recovery phase (step 802). A recovery phase is optional in the sense that a recovery phase is not needed if no problems arise in the start-up phase. The recovery phase allows resources and all dependent resources to be recovered.

In cases where an element has already been processed successfully, and its resource fails, then a recovery phase for the element will be entered. The recovery phase proceeds in the same direction of processing as the start-up phase. Thus, the start point for the recovery phase is at the top, left most element. The recovery phase proceeds from this element, reprocessing this element and all dependent elements that are below and in the same row, until reprocessing reaches the point where it would continue to process elements that had not been previously processed. At this point, the recovery phase is completed, and the start-up phase is resumed.

Next, the data processing system enters the operating phase (step 804). During the operating phase, the data processing system conducts operations according to the desires of the user. The data processing system monitors whether the operation operating phase is complete (step 806). If the operating phase is not complete, then the process returns to step 804 and repeats. However, once the operating phase is complete, then the shut-down phase begins (step 808).

The shut-down phase processes the elements with the aim of stopping resources represented by the elements. The shut-down phase sets the direction of element processing from bottom to top, right to left, which is the opposite direction from the start-up phase. This directionality of processing is shown in FIG. 5. Thus, generally, elements at the bottom right are processed before elements at the top left. In the case of specific element dependencies, the element to the left will not be processed until all right most columns have reached the point of processing their elements in the same row.

Elements or cells in the illustrative tables can contain control information for one or more of the three phases described with respect to FIG. 8. For example, the start-up phase uses a command to execute if the corresponding element should be started. A state or set of states that, when reached, determines that the element has completed processing.

The shutdown phase similarly uses a command to execute if the element should be stopped. A state or set of states that, when reached, determines that the element has completed processing.

The recovery phase, likewise, uses a state or set of states that determines that the element has entered the recovery mode. A recovery command and a state or set of states that, when reached, determine when the recovery processing has completed.

Any of these phase sets of control information can be omitted, in which case the corresponding element will not participate in that phase. Thus, in this manner individual actions can be skipped.

An element can also have timing information that determines which dates and at which time the element can be processed. Timing information can be considered to be control information. An element may have multiple dates, but should have only one time after which it may be processed. An element can be marked as unscheduled, which excludes that element from processing for any phase.

Columns can also have details or other information associated with them. For example, a column, which represents an application, can be marked as unscheduled. In this case, the column is excluded during a particular phase. Correspondingly, all the row elements for that column are excluded from processing for a given phase.

A column may also have a role. This role can be used in the start-up, shut-down, and recovery phases to select appropriate commands for all row elements within the column.

Figure 9:
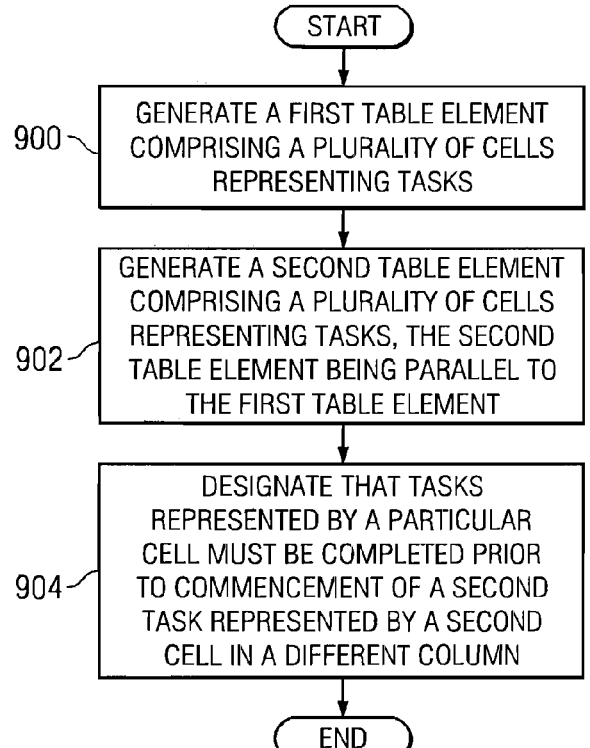
FIG. 9 is a flowchart illustrating a process of creating a table that represents a series of actions to be taken in a data processing system, in accordance with an illustrative embodiment.

FIG. 9 is a flowchart illustrating a process of creating a table that represents a series of actions to be taken in a data processing system, in accordance with an illustrative embodiment. The process shown in FIG. 9 can be implemented in a data processing system, such as data processing system 100 shown in FIG. 1. Specifically, FIG. 9 illustrates a method of generating any of the tables shown in FIG. 3 through FIG. 7.

The process begins as the data processing system generates a first table element comprising a plurality of cells representing tasks (step 900). More particularly, the data processing system generates a first table element, the first table element comprising a first plurality of cells, wherein ones of cells in the first plurality of cells represent corresponding ones of the tasks, and wherein, for any two cells in the first plurality of cells, the first cell in the first plurality of cells represents a first task that must be performed prior to commencement of the second task represented by a second subsequent cell in the first plurality of cells, relative to a base direction that is parallel to the first table element.

Next the data processing system generates a second table element comprising a plurality of cells representing tasks, the second table element being parallel to the first table element (step 902). More particularly, the data processing system generates a second table element that is parallel to the first table element, the second table element comprising a second plurality of cells, when ones of cells in the second plurality of cells represent corresponding ones of the tasks, and wherein, for any two cells in the second plurality of cells, the first cell in the second plurality of cells represents a first task that must be performed prior to commencement of a second task represented by a second subsequent cell in the second plurality of cells relative to the base direction.

Next, the data processing system designates that tasks represented by a particular cell must be completed prior to commencement of a second task represented by a second cell in a different column (step 904). More particularly, in every instance where a particular one of the tasks represented by a particular one of the cells in a first column must be completed prior to commencement of a second particular one of the tasks represented by a second particular one of the cells in a second column, the second particular one of the cells in the second column is subsequent to the first particular one of the cells in the first column, relative to the base direction. The process terminates thereafter.

In an illustrative embodiment, the first table element and the second table element are rows. However, in another illustrative embodiment the first table element and the second table element are columns. Thus, in any of the illustrative embodiments described with respect to FIG. 2 through FIG. 9, rows and columns can be switched in order to represent a table in a desired format. Thus for example, applications can be corresponded to rows, and individual tasks be corresponded to columns—which is the opposite of the presentation shown in FIG. 3 through FIG. 7.

In an illustrative embodiment, a table can be part of a user interface. Thus, the table can be used to control subsequently dependent operations of a computer system. In an illustrative embodiment, the tasks are performed pursuant to one of shutting down a data processing system, restoring a data processing system, and starting a data processing system. These processes are described with respect to FIG. 8.

In another illustrative embodiment, each of the plurality of cells in each of the second plurality of cells contains corresponding control information. Examples of control information include a command to start a corresponding task represented by a corresponding cell, a command to stop the corresponding task represented by the corresponding cell, and/or a command to indicate that the corresponding task represented by the corresponding cell has entered recovery mode. The control information can also comprise timing information that determines at which time a corresponding task can be processed. Thus, control information can comprise enabling information that determines whether a corresponding task will participate in one of a start-up phase of a data processing system, a recovery phase of the data processing system, or a shut-down phase of the data processing system.

Thus, the illustrative embodiment provide for a computer implemented method for representing actions in a data processing system. A table is generated. The table comprises a plurality of rows and columns. Ones in the columns represent corresponding ones of computer applications that can start or stop in parallel with each other in a data processing system. Ones in the rows represent corresponding ones of sequences of actions within a corresponding column. Additionally, the table represents a definition of relationships among memory address spaces, where the table represents when each particular address space is started or stopped during one of a start-up process, a recovery process, and a shut-down process. The resulting table is stored and can be later displayed.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for representing dependencies among tasks in a table, the computer-implemented method comprising:
   storing a table comprising a plurality of rows and columns, wherein ones of the columns represent corresponding ones of computer applications that can start or stop in parallel with each other, wherein the table comprises a plurality of cells, where one or more of the given cells of the table comprises an element and wherein ones of the rows represent corresponding ones of sequences of actions within a corresponding column represent corresponding ones of computer applications;
   generating a first table element, the first table element comprising a first plurality of cells, wherein ones of cells in the first plurality of cells represent corresponding ones of the tasks, and wherein, for any two cells in the first plurality of cells, the first cell in the first plurality of cells represents a first task that must be performed prior to commencement of a second task represented by a second subsequent cell in the first plurality of cells, relative to a base direction that is parallel to the first table element;

generating a second table element that is parallel to the first table element, the second table element comprising a second plurality of cells, wherein ones of cells in the second plurality of cells represent corresponding ones of the tasks, and wherein, for any two cells in the second plurality of cells, the first cell in the second plurality of cells represents a first task that must be performed prior to commencement of a second task represented by a second subsequent cell in the second plurality of cells, relative to the base direction;

generating a second table element that is serial to the first table elements and represents processing that proceeds across corresponding ones of rows, processing each column event in the corresponding rows in turn; and wherein all elements preceding a particular element in a given row and column represent those first elements that are required for the particular element to be processed, and wherein all elements following the particular element in the given row and column represent those second elements that require the particular element to be processed, wherein the all elements preceding a particular element are all elements extending from the particular element in both (i) a given horizontal direction away from the particular element, and (ii) a given vertical direction away from the particular element; and wherein, in every instance where a particular one of the tasks represented by a particular one of the cells in a first column must be completed prior to commencement of a second particular one of the tasks represented by a second particular one of the cells in a second column, the second particular one of the cells in the second column is subsequent to the first particular one of the cells in the first column, relative to the base direction, wherein the table comprises part of a user interface.

2. The computer-implemented method of claim 1, wherein the first table element and the second table element are rows.

3. The computer-implemented method of claim 1, wherein the first table element and the second table element are columns.

4. The computer-implemented method of claim 1, further comprising:
using the table to control sequentially dependent operations of a computer system.

5. The computer-implemented method of claim 1 wherein the tasks are performed pursuant to starting a data processing system.

6. The computer-implemented method of claim 1, wherein each of the first plurality of cells and each of the second plurality of cells contain corresponding control information.

7. The computer-implemented method of claim 6 wherein the control information comprises at least one of:
a first command to start a corresponding task represented by a corresponding cell;
a second command to stop the corresponding task represented by the corresponding cell;
a third command to indicate that the corresponding task, represented by the corresponding cell, has entered a recovery mode.

8. The computer-implemented method of claim 6 wherein the control information comprises timing information that determines at which time a corresponding task can be processed.

9. The computer-implemented method of claim 6 wherein the control information comprises enabling information that determines whether a corresponding task will participate in one of a start-up phase of a data processing system, a recover phase of the data processing system, or a shut-down phase of the data processing system.

10. The computer-implemented method of claim 1 wherein the first table element comprises a first row and the second table element comprises a second row, wherein the table comprises corresponding columns created by the first table element and second table element, and wherein the tasks are represented as being processed in parallel for each of the corresponding columns.

11. The computer-implemented method of claim 10 wherein at least one of the first table element and the second table element contains a coordinated event that is represented across a plurality of the corresponding columns, and wherein, for the coordinated event, parallel processing is represented as being interrupted at ones of the cells corresponding to the coordinated event until the coordinated event is resolved.

12. The computer-implemented method of claim 1 further comprises the particular one of the cells is a synonym element.

13. The computer-implemented method of claim 1, wherein the table represents a definition of relationships among memory address spaces that are each respectively occupied by a given application of a plurality of applications, wherein the table represents when each particular address space is started or stopped during one of a start-up process, a recovery process, and a shut-down process.

* * * * *